(12) United States Patent
Mucci et al.

(10) Patent No.: US 6,512,854 B1
(45) Date of Patent: Jan. 28, 2003

(54) ADAPTIVE CONTROL AND SIGNAL ENHANCEMENT OF AN ULTRASOUND DISPLAY

(75) Inventors: Ronald Mucci, Westwood, MA (US); Frank R Miele, Methuen, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/307,269

(22) Filed: May 7, 1999

(51) Int. Cl.[7] .................................................. G06K 9/40
(52) U.S. Cl. ........................ 382/275; 382/128; 600/437
(58) Field of Search ................................. 382/128, 254, 382/275; 600/437, 443, 447

(56) References Cited

U.S. PATENT DOCUMENTS

| | | | | |
|---|---|---|---|---|
| 5,497,777 A | * | 3/1996 | Abdel-Malek et al. | 600/443 |
| 5,574,212 A | * | 11/1996 | Madsen et al. | 73/1.82 |
| 5,619,998 A | * | 4/1997 | Abdel-Malek et al. | 600/437 |
| 5,670,719 A | * | 9/1997 | Madsen et al. | 73/619 |
| 5,846,203 A | * | 12/1998 | Koo et al. | 600/454 |
| 5,860,930 A | * | 1/1999 | Guracar | 600/455 |

* cited by examiner

Primary Examiner—Thomas D. Lee
(74) Attorney, Agent, or Firm—John Vodopia

(57) ABSTRACT

The invention implements a method for adaptively using raw image data (before compression) to produce pixel display values in an ultrasound system in accord with variations in signal-to-noise ratio. Initially, for each subject pixel of an image, a first regional value is derived by taking into account values of a neighborhood of pixels that includes the subject pixel. The first regional value is then compared to a threshold value related to noise and each subject pixel is assigned a classification as a tentative signal pixel if the regional value equals or exceeds the threshold value. Any pixel value not so classified is considered a tentative noise pixel. A second regional value is then derived for each subject pixel by taking into account first regional classifications of a second neighborhood of pixels that includes the subject pixel. If the number of signals classified as signal in the second neighborhood is less than a second threshold, the subject pixel is classified as noise. Otherwise the subject pixel is classified as a signal pixel. The actual values of the subject pixels are then adjusted to improve a display of the ultrasound image and the corresponding audio presentation (for Doppler). The method also alters the threshold noise value in accordance with second regional pixel values classified as noise pixels.

17 Claims, 6 Drawing Sheets

ADAPTIVE CONTROL AND SIGNAL ENHANCEMENT OF AN ULTRASOUND DISPLAY

FIELD OF THE INVENTION

This invention relates to a procedure for improving displayed ultrasound images and corresponding audio output and, more particularly, to a method and apparatus for adaptively deciding whether image information is noise or signals containing information and for selectively enhancing the information signals in relation to the noise.

BACKGROUND OF THE INVENTION

Ultrasound (U/S) imaging systems are widely used in the medical profession to diagnose a range of pathologies. Information from within the body is acquired primarily by transmission, backscattering, reception and subsequent processing of an acoustic signal. The acoustic signal contains information relevant to the sonofied region of interest. Sensing and subsequent amplification of the acoustic backscatter introduces an undesirable component in the signal stream referred to hereafter as noise.

The condition where the informational component is appreciably larger than the noise component is referred to as "strong signal"; where the informational component and noise are similar as "weak signal"; and where the noise is significantly larger than the informational component as "noise" or "noise-only". Further, the signal to noise ratio is the ratio of the power of the informational part of the signal to the power in the noise component.

Often, the relevant U/S information is presented on a display amidst a background of interfering noise. When the informational component of the processed acoustic signal is weak relative to the accompanying noise, i.e., a weak signal, evaluation of the data can be difficult and time consuming. That is, it can be difficult for the user to reliably evaluate or diagnose the patient condition in weak signal situations. Spectral Doppler imaging is an important modality of U/S that provides information about blood flow. For spectral Doppler imaging, U/S system performance is sensitive to the transmit power level, the receive gain, the velocity scale and the selected gray-scale function, to name a few of the relevant system controls. In present U/S systems, the operator must make appropriate adjustments to these controls to avoid compromising system performance.

The common method for presenting the U/S data for evaluation is visual display. Generally, the visual (video) display is produced by encoding the information in a black and white (gray-scale intensity) or color format. The relevant information to be displayed is extracted from the "back-scattered" acoustic wave. Commonly in medical applications it is the back-scattered power alone or power in conjunction with the phase that serves as the measurement, displayed visually or output audibly, from which diagnoses are derived. In the spectral Doppler modality, the U/S data is also presented in an audio format as a stereophonic audible output.

Customarily, the sensed acoustic signal spans a wide range of values in response to backscattering and propagation effects within the body. This range of values of signal power is referred to as the dynamic range of the received signal. Most systems afford the operator an ability to adjust the transmit power level and receive gain to accommodate the back-scattering and propagation effects affecting dynamic range.

The range of intensities achievable by a video display is also referred to as the dynamic range or intensity range of the display. Most systems afford the operator the ability to adjust the compression (i.e., mapping function) of the dynamic range of the received signal power to the dynamic range afforded by the display system. For example, a signal value may be represented by a sixteen bit value ranging from zero to approximately 64,000, whereas the video display may support only a dynamic range of eight bits, i.e., 0 to 255. The compression function maps the 12 bit signal dynamic range to the 8 bit dynamic range of the display. This compression function is generally non-linear and is intended to enhance the presentation of the information relative to the noise.

For example, in a black and white (gray-scale) image, the measured value of the received acoustic data is encoded and displayed, using the higher levels of intensity to display information signals. The lower levels of display intensity are allocated to noise-only values. Non-linear mapping attempts to map the range of noise values into a disproportionately small region at the low (weakly visible) end of the dynamic range of the display, thereby leaving the large remainder of the dynamic range to signal values, ranging from weak to strong.

A gray scale or color map is used to convert a measurement value to be displayed (signal amplitude, for example) into either a black and white (gray-scale intensity) or a color video signal. That is, the color map or gray scale contains the transformation information necessary to map the measurement signal into the video signal that controls display illumination on a pixel by pixel basis.

Among the design objectives of a gray-scale conversion function are: (1) an appropriate mapping of the range of U/S measurements values to the range of intensities achievable by the display monitor, and (2) the mapping of values, containing diagnostic information, to intensities that are distinguishable from values consisting primarily of noise. Presently the user of an U/S system controls video display of the processed acoustic signal by selecting one of a number of stored color maps (i.e., compression curves) in conjunction with the transmit power and receive gain settings. The color maps/gray scales are designed to cover a range of weak signal, strong signal and noise conditions, in conjunction with subjective preferences attributable to the user. However, often the imaging is done with system settings, a transmit power level, receive gain and color map or compression curve which do not employ the dynamic range of the display system effectively and hence, do not achieve the desired quality of presentation. Furthermore, the values of the weak signals are similar to those of the competing noise. Thus, delineation of weak signals from noise is difficult, even when the system settings are adjusted properly.

There is a need for improved U/S presentation of information data in the presence of noise. Further, there it is desired to divorce control of the display from signal intensities that are solely based on individual measurement samples.

SUMMARY OF THE INVENTION

The invention implements a method for adaptively using raw image data (before compression) to produce pixel display values in an ultrasound system in accord with variations in signal-to-noise ratio. Initially, for each subject pixel of an image, a first regional value is derived by taking into account values of a neighborhood of pixels that includes the subject pixel. The first regional value is then compared to a threshold value related to noise and each subject pixel is assigned a classification as a tentative signal pixel if the regional value equals or exceeds the threshold value. This conditional assignment is based on the conclusion that the values within the neighborhood have a higher probability of being a signal population than a noise population. Any pixel value not so classified is considered a tentative noise pixel. A second regional value is then derived for each subject pixel by taking into account first regional classifications of a second neighborhood of pixels that includes the subject pixel. If the number of pixels classified as signal in the second neighborhood is less than a second threshold, the subject pixel is classified as noise. Otherwise the subject pixel is classified as a signal pixel. The actual values of the subject pixels are then adjusted to improve a display of the ultrasound image and the corresponding audio presentation, in the case of Doppler. The method also alters the threshold noise value in accordance with second regional pixel values classified as noise pixels.

DETAILED DESCRIPTION OF THE PREFERRED EMBODIMENT

Figure 1:
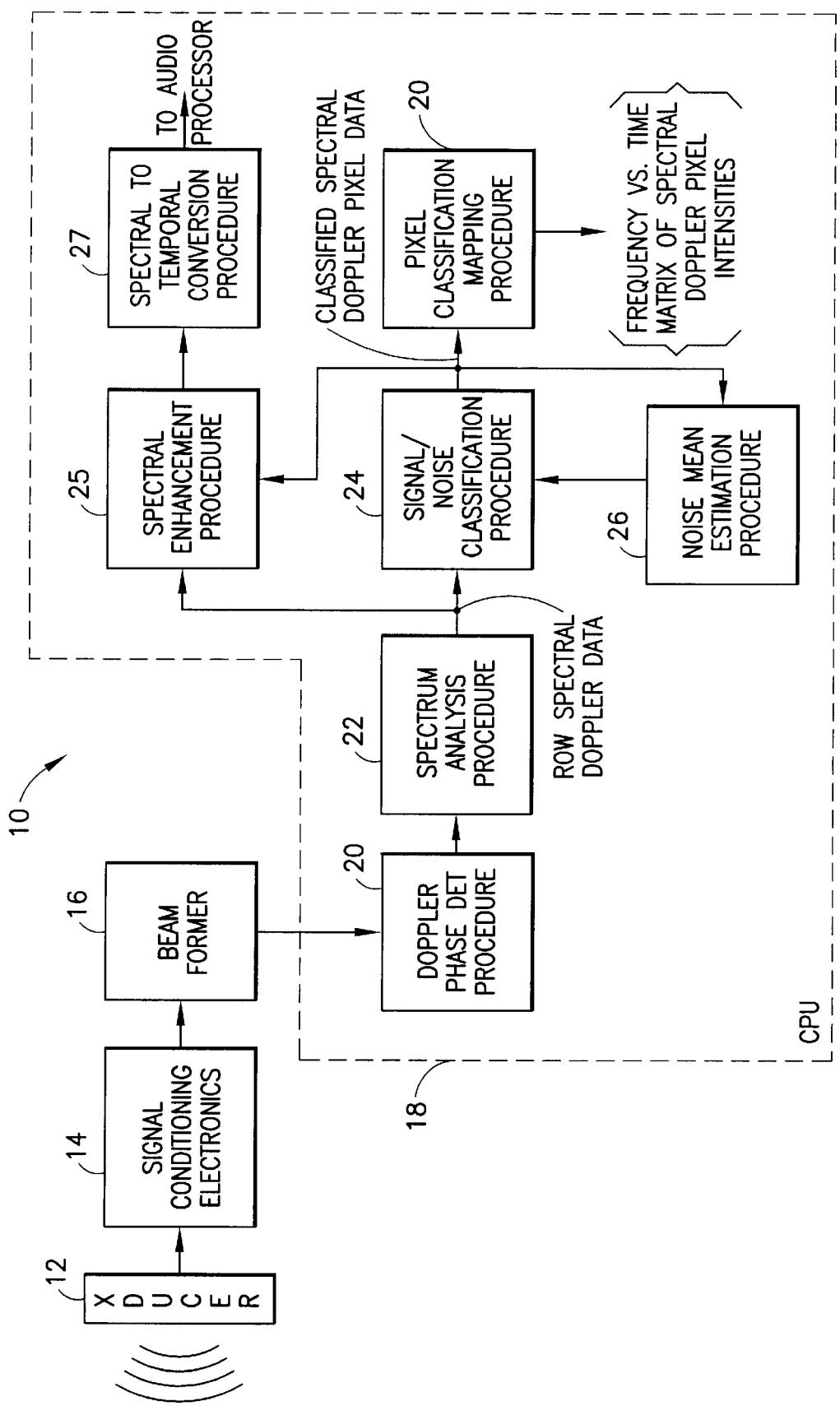
FIG. 1 is a block diagram of a system for carrying out the invention.

The invention analyzes raw pixel data prior to compression in order to determine effective system settings that "optimize" a data display of the image. Conceptually, the invention estimates the statistical characteristics, varying in both time and location within the body, of the signal and noise. Once the relevant noise and signal parameters have been estimated, the relevant system settings, all or a selected few, are adjusted automatically in "real-time" to optimize data presentation. That is, once signal characteristics are known, the range of signal values is known and the transmit power level, receive gain and signal mapping to display intensity can be adjusted automatically. The known noise characteristics are then used to map the range of noise values to a region of display intensities allocated to noise and, similarly, the signal values to appropriate regions of display intensities.

Although conventionally, the term pixel is used to refer to displayed picture elements, herein it is applied to elements of image data within processing stages prior to output to the display monitor. The invention enables individual pixel values to be classified as signal or noise, not solely based on their individual measurement values, but in conjunction with other correlated measurement values, once the signal and noise statistical characteristics have been ascertained. So, for example, measurements identified as a signal on the basis of other correlated measurements are mapped to the higher region of display intensities reserved for signals, even when an individual measurement might otherwise warrant a low display intensity owing to its low power value (in the prior art systems). Similarly, large values classified as noise, that would otherwise warrant a high display intensity in a prior art system, might be mapped to a low display intensity by the invention.

In addition to mapping each data value to a black and white display intensity so as to enhance signals relative to noise, color encoding can be used. That is, a color hue can be superimposed over the data based on the classification as signal or noise to further distinguish weak signals from noise. The application of color informs the operator of the resulting classification of the data by the system as either signal or noise.

Automation of system control and enhancement of the signal relative to noise afforded by the invention not only simplifies the operation of the U/S system, but also improves the accuracy of estimates of blood flow (or tissue motion) parameters in the spectral Doppler modality, thereby providing more accurate information for diagnostic purposes.

A description follows of the ultrasound system and method which (1) classifies pixel data on the basis of estimates of signal and noise values, (2) automatically adjusts the relevant system settings, and (3) enhances the values classified as signal relative to the noise values. For the purpose of this description, the spectral Doppler video display of back-scattered signal power as a function both of blood velocity or tissue motion and time will be considered as will the corresponding audio output. However, it is to be realized that the invention is equally applicable to other ultrasound modalities.

The invention will be described in the context of the block diagram shown in FIG. 1 and in conjunction with the flow diagram of FIG. 2. Thereafter, additional details concerning the method of the invention will be described. Lastly, a description is provided of the theory underlying the Rayleigh distribution modeling of the received acoustic signals.

Turning first to FIG. 1, ultrasound system 10 includes a transducer 12 that both transmits U/S signals and receives backscatter acoustic signals. Since, in this instance, the invention is described in context of spectral Doppler operation, transducer 12 emits pulses that are frequency displaced by, for instance, blood flow in an artery. The received backscatter signals are passed from transducer 12 to a signal conditioning module 14 and then to a beamformer 16 which conforms the signals to a standard beam configuration.

Thereafter, the signals are fed into a central processing unit (CPU) 18 where they are subjected to a number of software-controlled processes. Initially, the raw ultrasound signals are fed to a Doppler phase detector process 20, followed by a spectrum analysis procedure 22. The spectrum analysis procedure 22 recovers the predominant frequencies of the backscatter signals, along with accompanying noise. Doppler phase detection procedure 20 and spectrum analysis procedure 22 both act on digital signal values and provide pixel value outputs in accordance with the energy contained in the received signals.

The pixel signal values exiting from spectrum analyzer procedure 22 are fed both to a signal/noise classification procedure 24 (wherein the principal actions of the invention are centered) and to a spectral enhancement procedure 25 which enhances the power of frequencies that are classified as signal relative to the noise, for both video and audio output purposes.

The objective of the operations of signal/noise classification procedure 24 is to differentiate data signals from noise and enable subsequent enhancement of the data signals or inhibition of the noise signals, or a combination of both. A feedback value from noise mean estimation procedure 26 enables a noise value to be fed back to signal/noise classification procedure 24 and to be continually updated as the noise level varies. The output from signal/noise classification procedure 24 is also fed to spectral enhancement procedure 25 which operates upon the spectral input and emphasizes the frequency returns that are classified as signal. The enhanced frequency returns are then converted to a temporal signal by spectral to temporal translator 27 (i.e., an inverse fast Fourier transform) which, in turn, outputs a stereo audio signal to aid the user in assessing the flow paths being imaged.

Figure 2:
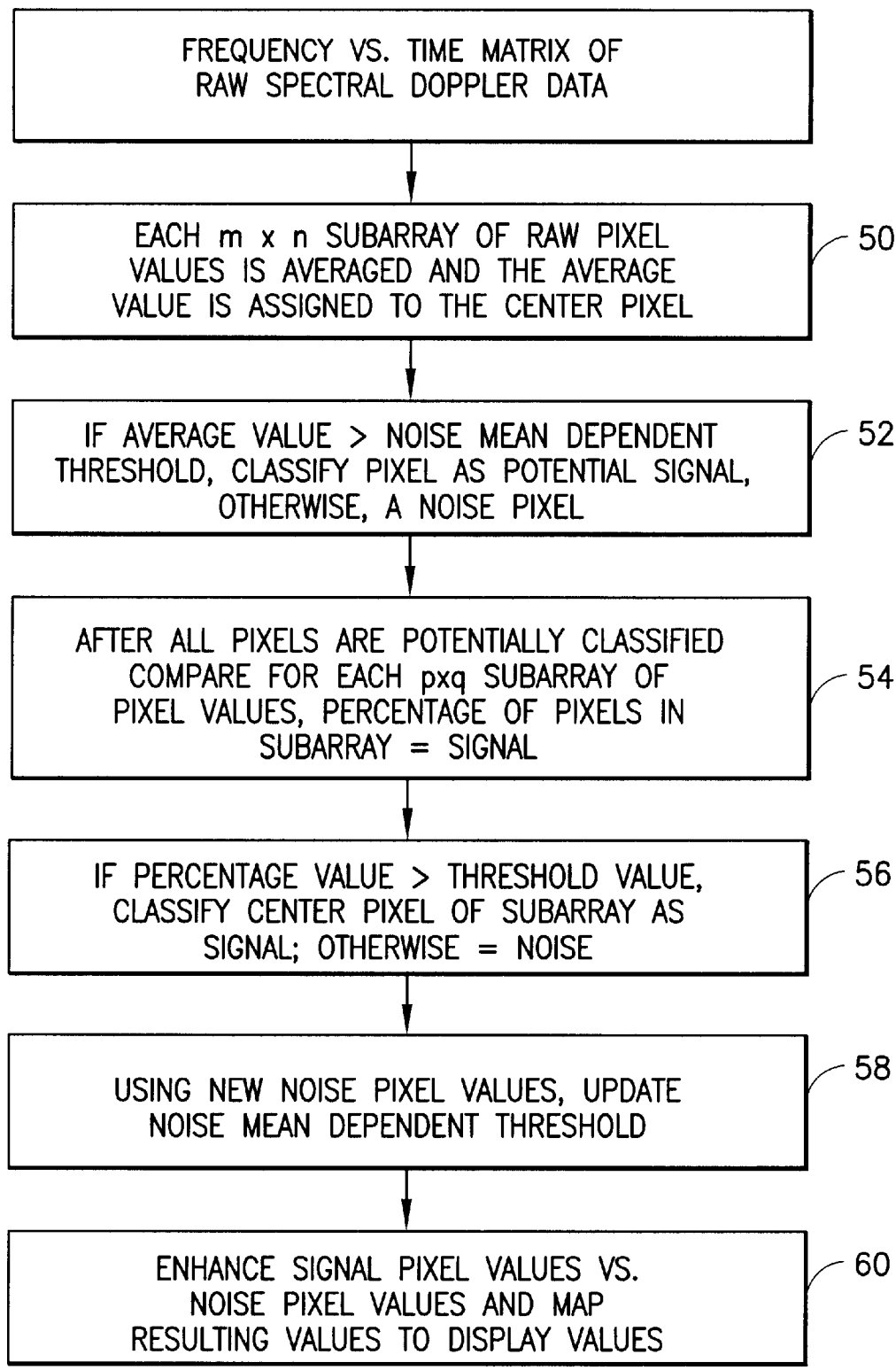
FIG. 2 is a logic flow diagram illustrating the method of the invention.

The flow diagram of FIG. 2 is illustrative of the procedure as carried out by signals/noise classification procedure 24 and noise mean estimation procedure 26. Step 50 receives pixel magnitude values from spectrum analysis procedure 22 and assembles an n×m array of pixel values (wherein n and m are integers that may or may not be equal). Assuming that n and m both equal 7, the pixel array comprises a 7×7 set of image pixels. That array of pixels is hereafter referred to as a first region of image pixels. The first region is assumed to primarily include noise values or, in the alternative, signal values. All of the pixel values in the first region are averaged and the average value (i.e., a "first regional value") is then associated with the center pixel of the first region. The basis for this calculation is that a region of signal values will demonstrate a greater mean value than such a region of noise values, with the separation being dependent upon the signal-to-noise ratio.

If the first regional value associated with the center pixel exceeds a noise-mean dependent threshold value, the center pixel is classified as a potential signal pixel, otherwise it is classified as a potential noise pixel (step 52). As will be understood from the description below, noise mean estimation procedure 26 initially applies a test noise value threshold, which threshold is later corrected by feedback from the output of signal/noise classification procedure 24. The starting classification that occurs in step 52 is essentially a preliminary classification of each of the image pixels that comprise a frequency vs. time matrix of spectral Doppler data.

At the completion of processing of all the image pixels, each image pixel has been preliminarily classified as either a signal pixel or a noise pixel (i.e., any pixel that is not classified as a signal pixel is considered a noise pixel).

Subsequent to the initial classification, a second calculation is performed to assess for each subject pixel, in regards to a second region surrounding each subject pixel, the percentage of preliminarily classified signal pixels within the second region. More specifically, for each succeeding second region, the percentage of pixels initially classified as signal therein is compared to a second threshold value, and if that threshold is exceeded, the subject pixel within the second region is finally classified as signal, otherwise it is classified as noise. This calculation is carried out by counting the number of signal pixels that fall within the second region—comprising a p×q matrix of image pixels (step 54). This action assures that if a conditionally classified signal pixel is in a "neighborhood" that largely includes noise pixel values, then it is concluded that the signal pixel is an anomaly and the pixel is reclassified as noise.

The purpose of this action is to eliminate (or classify as noise) small isolated regions or islands of pixels that result from ultrasound image data deemed to be too isolated to be meaningful signal. Accordingly, a second threshold value related to a small number of signal pixels in the second regions is compared to the second regional value for the center pixel. If the second regional value assigned to a center pixel exceeds the second threshold value, that center pixel is assigned the classification of a signal pixel (step 56). Any center pixel whose second regional value equals or is less than the second threshold value is assigned the classification of a noise pixel (step 54).

Each noise pixel value is then combined with previous noise pixel values and an updated noise mean estimation value is calculated and is utilized to alter the noise threshold value used in step 54 (step 58).

Thereafter, each actual pixel value of a signal pixel may be subjected to an enhancement action so as to further differentiate it from noise pixels in the visual display or audio presentation of the information. Since, in this example, it is assumed that 12 bit ultrasound pixel values are used, those values must now be converted to 8 bit values to be used for display purposes. During this conversion/compression action, a nonlinear relationship may be employed which results in enhancement of signal pixels vs. noise pixels. In similar fashion, the noise pixel values may be de-emphasized in this conversion/compression procedure (step 60).

As is now readily apparent, the method of the invention enables fully automatic, adaptive enhancement of signal pixels and adjustment of a noise threshold based upon current noise in the system, so as to assure highly accurate pixel classifications.

In summary, the method of the invention is a multi-step process. The steps comprise: (1) obtaining estimates of signal and noise characteristics, (2) classification of each data sample as signal or noise, (3) updating the signal and noise estimates, (4) providing signal enhancements relative to noise for purposes of presentation (both video and audio), and (5) updating the adjustment of the relevant system settings. These steps are performed continuously in real time. A further detailed description of each step of this process is provided below, followed by a brief description of mathematical models employed for statistical characterization of the signal and noise.

1) Estimation of Signal and Noise Characteristics

The first step is the estimation of the noise mean. This can be accomplished in a number of ways. One real-time method is simply to turn off the transmit power level and measure the mean of the resulting data sequence (which consists only of electronic system noise). An alternative is to measure and record the mean of the noise at the "factory" for each of the transducers, with the system in the spectral Doppler modality and no signal present. The measured noise means are then used to create a look-up table of noise mean values to be used in conjunction with the system settings during actual use of the system to obtain an initial estimate for the noise mean.

Although these procedures provide only an approximate estimate of the noise mean, a more accurate estimate is obtained in a later step which bases the estimate of both the noise and signal mean on real-time data.

2) Signal and Noise Classification

The measurement values are classified as signal or noise in a two step procedure: estimation of the local mean value and threshold value. The measurements are classified on the basis of not only the value of the individual measurement but also on the values of surrounding or "neighboring" pixel measurements. That is, it is assumed that if a measurement contains signal, then the neighbor measurements also contain signal and possess a similar statistical mean. Similarly, for noise, if a value is noise only, then it is assumed that a collection of neighbor measurements are noise only and hence, are characterized by the mean of the noise. For example, for spectral Doppler it is assumed that if a signal is present in a certain velocity cell, then adjacent cells in both time and velocity will contain signal. Here signal implies measurement of acoustic energy backscattered by scatterers of a specific velocity. Similarly, if a velocity cell contains noise-only, it is highly probable that the adjacent cells contain only noise as well. Furthermore, the mean associated with signal values exceeds the mean of noise only in proportion to the signal-to-ratio.

Figure 3:
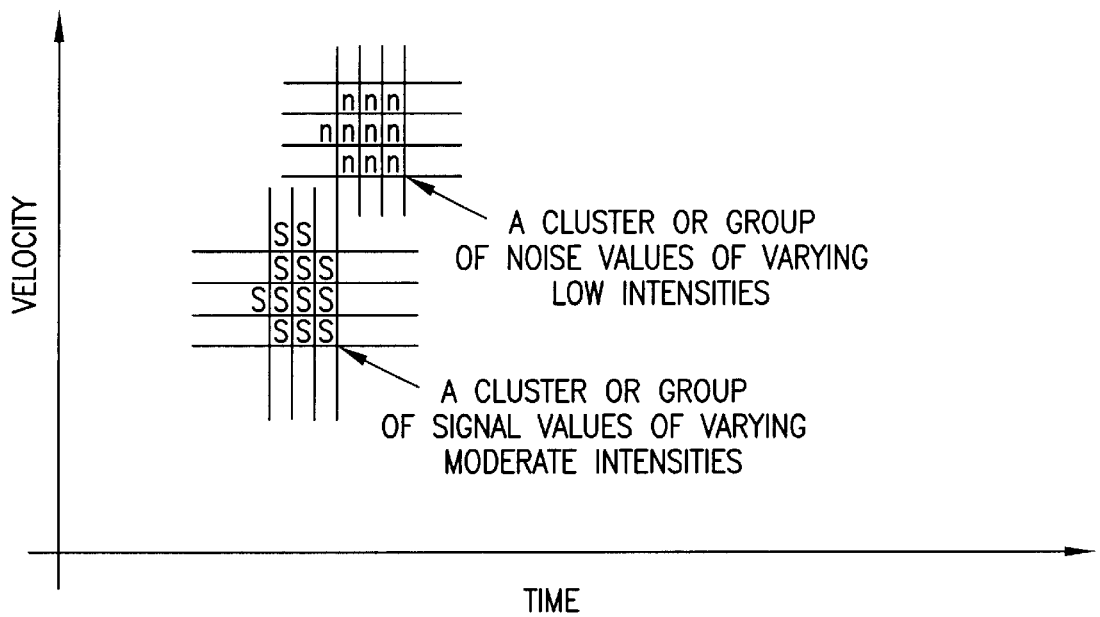
FIG. 3 depicts portions of a bitmap with different clusterings of pixels.

It is precisely the observable difference, reflected in display intensity, of the localized means of data clusters which the operator of the U/S system uses to distinguish between signal and noise. This is depicted in FIG. 3. By evaluating the set of related measurements, that is, by considering the surrounding neighbor measurements, the probability that the central value contains signal or noise-only can be estimated. This probabilistic metric is used to classify the measurement as signal or noise with a corresponding level of confidence of classification. For neighborhoods or regions containing a portion of noise classifications and a portion of signal classifications, an improved classification of pixels is enabled through use of the second threshold value and the relative sizes of the signal/noise portions.

There are various procedures for determining the likelihood that a set of related measurements are from one population (Rayleigh with signal plus noise mean) or another (Rayleigh with noise mean). First, an estimate is calculated of a small set of values (power-like or amplitude measurements) closely spaced in velocity and time. Using this approach, the average of the set of values serves as the estimate of the mean. Next, a "central" measurement is classified as signal or noise and a confidence factor assigned, depending upon the 'distance' of the calculated local mean of the small set of data values from the mean estimated for the noise. In this approach, the difference between the local mean and the estimate of the noise mean serves as a distance metric. That is, if the estimate of the local mean exceeds the noise mean by a certain amount, referred to as the detection threshold, the data value is classified as containing signal. The amount the local estimate exceeds the noise mean relative to the signal mean serves as a measure of confidence in the classification.

A signal detection (classification) threshold can be determined as follows. First, a probability is specified that a data value containing only noise is classified incorrectly as signal. The detection threshold consistent with this specification is determined from the cumulative probability distribution function (cpdf). For spectral Doppler, the probability density function describing the signal and noise is Rayleigh. The detection threshold can be determined from the cumulative distribution function for this Rayleigh distribution, such that only with the specified frequency of occurrence does a sample of noise exceed the threshold.

3) Estimation Update

Once a value has been preliminarily classified as signal or noise, the value is incorporated into a running average of the means. That is, as new values (measurements) are classified as signal, the estimate of the signal mean is updated, using these most recent values in conjunction with the existing estimate. This procedure of maintaining a running average of the classified values is equally applicable to those data classified as noise. In this manner, a reliable and accurate estimate of the signal and noise means are maintained for the purpose of automatically controlling the relevant system settings and enhancing the signal relative to noise for presentation purposes.

4) Data Presentation

The method of the invention accomplishes two data presentation features, i.e., signal enhancement and auto-gray-scaling. These are distinct procedures that can be used separately or collectively. For example, signal enhancement relative to noise can be used for both video and audio data presentation, gray-scaling is only applicable to video.

Existing art employs a gray-scale function to map received signals to the dynamic range of the display. The operator must select a gray-scale function in conjunction with other system controls such as transmit power level and receive gain so as to display the data in a manner satisfactory for diagnostic purposes. The non-linear aspect of the gray-scale function provides a degree of signal enhancement, that is, separation of signal and noise display intensities. However, for weak signals the range of signal values and noise values overlap and only a small degree of separation is achievable. The operator must select the gray-scale so as to fit the received data to the dynamic range of the display as well as to provide an amount of non-linearity to achieve noise rejection and signal contrast appropriate to diagnostic purposes. This is a difficult procedure and is sometimes impossible for very weak signals using existing technologies.

The method of the invention not only eliminates the need to select a grayscale but also enhances the signal in a manner which achieves good separation, even for weak signals. The two procedures, signal enhancement and auto-gray-scaling, are described below.

5) Data Presentation—Signal Enhancement

Here, signal enhancement refers to a process of increasing the mean of signal values relative to the mean of the noise, principally for display purposes and for purposes of discerning signal from noise. The prior art achieves a degree of signal enhancement through the use of a non-linear gray-scale function to convert individual values to display intensity. Higher data values are displayed with greater display intensity relative to smaller values, regardless of whether they represent signal or noise. Hence, large noise values are displayed with the same intensities as are large signal values; small signal values are displayed with the low intensities reserved for noise values.

In the method of the invention, the values classified as signal are increased, regardless of whether they are small or large, prior to gray-scaling. This enhancement of the total population of signal values effects a greater shift in the mean of the signal relative to that of the noise than the prior art methods. Similarly, the values classified as noise can be reduced, either as an alternative to, or in conjunction with, the signal increase.

Signal enhancement serves to separate the distribution of signal values from noise values (in amplitude) in such a way that even weak signals can be evaluated with high diagnostic accuracy. Further, in spectral Doppler, the enhancement of signal produces a higher quality output.

6) Data Presentation—Auto-gray-scale

The purpose of the gray-scale function or "compression" is two-fold: (1) to map the dynamic range occupied by the signal and noise to the dynamic range of the display, and (2) to present the signal and noise such that the two are readily discernible. However, since the new method of signal enhancement separates the signal and noise, the primary function of the gray-scale is to map the received signal dynamic range to that of the display. That is, signal enhancement in conjunction with estimates of the signal and noise statistical characteristics simplifies the selection of a gray-scale function.

In prior art, gray-scaling is accomplished in the following manner. The smaller data values, i.e., those assumed to be noise, are mapped to the lower region of video intensities and the larger values, those assumed to be signal, are mapped to the higher intensities. This action reduces the frequency that a signal value and a noise value will be displayed with similar intensities. This mapping is frequently non-linear, in that all small values, i.e., those considered to be noise-only, are mapped to a small range at the lower range of intensities of the video display. Similarly, all values considered to be strong signal are mapped to a small range at the higher end of the video display. The intermediate values are mapped to the proportionately large remaining region of the display dynamic range to enhance the display of weak signals relative to the noise.

For the invention, once the signal and noise means have been determined, the mapping function can be determined automatically. One auto-gray-scaling procedure simply uses a fixed gray-scale function in conjunction with signal enhancement, while another bases the gray-scale function on the estimates of the signal and noise characteristics. The simpler fixed gray-scale function approach is described here, while the more complex alternative is described below.

Figure 4:
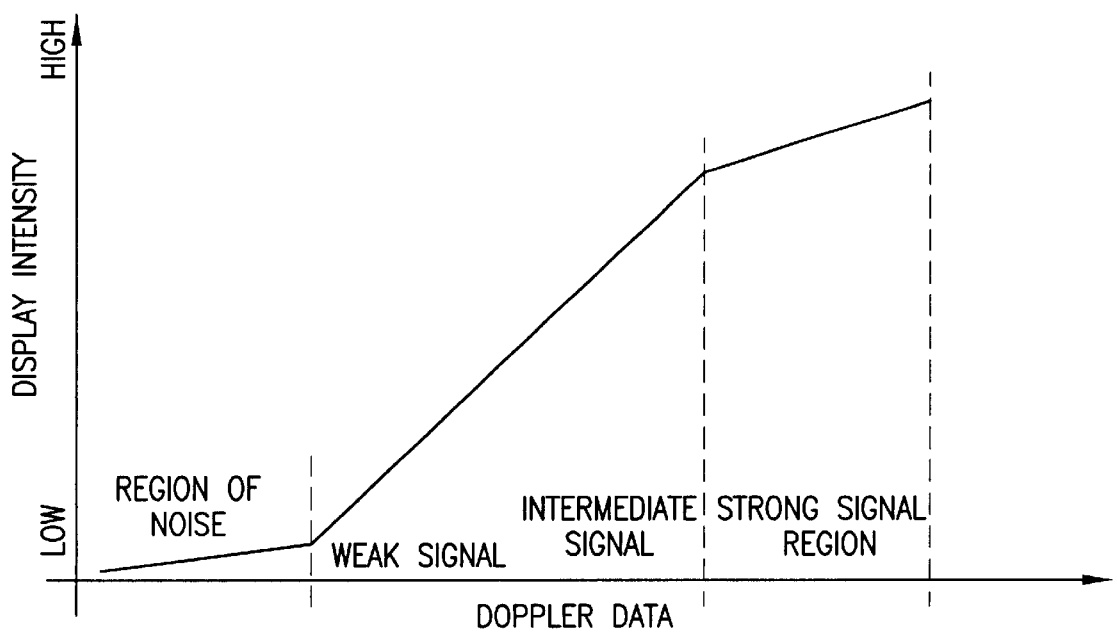
FIG. 4 is a simplified gray-scale function for mapping spectral Doppler values to display intensities.

The fixed gray-scale approach is as follows. First, a gray-scale function is designed with a small region at the low end of the display dynamic range allocated to noise, a small region at the high end of the display dynamic range allocated to strong signals and the remaining region allocated to weak and intermediate signals. This is depicted in FIG. 4. Next, since the noise values have been identified and the mean estimated, each noise value is mapped (scaled) to provide a new noise mean that coincides with the region of the gray-scale function allocated to noise. Similarly, the signal values are scaled to the signal region of the gray scale in a manner to achieve the desired contrast. The strong signals are detected as those values classified as signal and exceeding a strong signal threshold. Once detected, the strong signals can be mapped to the region of the gray-scale function reserved for strong signal.

Although the gray-scaling can be fully automated, a contrast control can be provided to accommodate operator subjectivity. That is, a low contrast image can be achieved by spacing the transformed noise values and signal values "somewhat" closely, whereas a high contrast image can be realized by spacing the noise and signal values further apart. The distance or separation of the means (desired contrast) can be selected by the operator by appropriate adjustment of a contrast control.

7) Automatic Adjustment of System Control

Once the signal and noise characteristics have been determined, numerous system settings can be adjusted automatically by the U/S system or alternatively, an indication can be provided that the system settings warrant adjustment. For example, transmit power level, receive gain and velocity scale (pulse repetition frequency or PRF) and velocity baseline represent system settings relevant to spectral Doppler, and are customarily adjusted by the operator.

The transmit power level can be set on the basis of signal power relative to noise power (S/N) as determined from the estimates of signal and noise means. For example, in an adult Doppler study, the transmit power level can be set sufficiently high to achieve the desired S/N. However, for a fetal study, more caution is needed to avoid possible health risks associated with bio-affects resulting from the transmitted ultrasound beam. Using the estimates of signal and noise mean, the transmit power level can be set automatically to maintain a S/N of approximately 3 dB in a fetal study, which is generally sufficient for reliable and accurate measurements. The transmit power level can also be controlled to avoid back-scattered signals that exceed the limits of the receive electronics such as might occur with the use of contrast agents.

Similarly, the receive gain can be adjusted automatically so as to constrain the data, once received, to a range well suited to the system electronics, operator controls and display intensities.

For Doppler velocity scaling purposes, the maximum and minimum velocities can be determined from those values classified as signal, and the velocity scale and baseline can be set automatically to avoid aliasing. Here, aliasing refers to the operation of the system in such a manner that high velocity flow (or tissue motion) appears incorrectly as a result of sampling the phase of the back-scattered signal at an insufficient rate, i.e. insufficient PRF. Since the velocity is inferred from and proportional to a rate of change of phase of the back-scattered acoustic signal, the aliasing can be referred to as either velocity or frequency aliasing.

In summary, the invention includes a method which adjusts certain relevant system controls automatically, thereby reducing the demands on the operator and also reducing the occurrence of inferior system performance caused by improper setting of system parameters. Alternatively, the system may provide an indication which informs the operator that system adjustments may be required. This procedure for automation of system control is based upon real-time estimates of the signal and noise statistics.

In addition, the invention enables enhancement of signals relative to noise. The data values are classified as signal or noise, and those classified as signal are enhanced in real-time, relative to those classified as noise. In addition, the data can be colorized in conjunction with video presentation based on classification to further aid in the analysis of weak signals.

Both automatic control of system controls and signal enhancement rely upon classification of data values as signal or noise. The data classification relies upon both the first order statistics of the signal and noise and upon the correlation or dependence of one data value upon another.

8) Rayleigh Distribution and Modeling

It is known that a received acoustic signal can be modeled as a stochastic procedure with Gaussian statistics. It follows that the magnitude of such a signal can be modeled with a Rayleigh distribution. Similarly, the noise is Gaussian and it therefore follows that the magnitude of the noise can be modeled with a Rayleigh distribution. This model holds for both detected Doppler signals and discrete Fourier transform spectral Doppler data.

Rayleigh distribution is a single parameter probability density function which has a direct known relationship to the population mean. Hence, estimates of the mean of the magnitude of the data (both signal and noise) suffice to statistically characterize both.

In practice, the values to be displayed will fit a Rayleigh distribution. The primary basis for this is that the received signal is the additive combination of many small signals backscattered from individual scatterers. In addition, each receive channel is combined linearly in the beamformer. The addition of many random processes, based on the application of the central limit theorem, is known to produce a Gaussian distribution independent of the pdf of the individual constituents. The pdf of the envelope of a Gaussian random or stochastic procedure is Rayleigh.

The Rayleigh distribution is a single parameter pdf of the form $$p_R(r) = \begin{cases} \frac{r}{b}\exp(-r^2/2b) & \text{for } r > 0 \\ 0 & \text{otherwise} \end{cases}$$

where b denotes the single parameter required to describe the distribution of values, and the mean (or expected value), denoted $u_R$ of the distribution is given by $$\mu_R = \sqrt{\frac{\pi}{2}b}.$$

Hence, given the mean of the distribution $u_R$, the pdf can be expressed as $$p_R(r) = \begin{cases} \frac{\pi r}{2\mu_R^2}\exp(-\pi r^2/4\mu_R^2) & \text{for } r > 0 \\ 0 & \text{otherwise} \end{cases}$$

Figure 5:
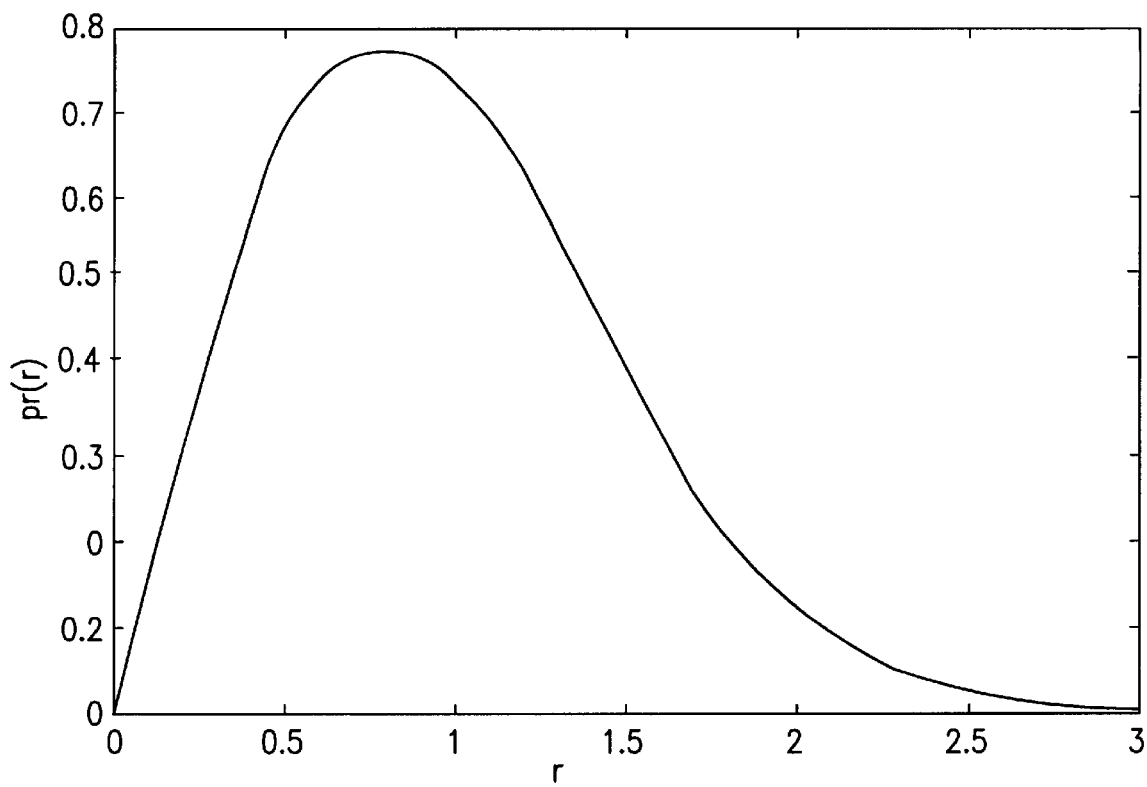
FIG. 5 is a plot of Rayleigh distribution for a mean of unity.

An example of the Rayleigh distribution is shown in FIG. 5 for a unity mean.

Auto-Generation of Gray-Scale

The following presents the specifics of the procedure that produces the gray-scale function with little or no operator intervention from the estimates of the signal and noise mean, $u_S$ and $u_N$, respectively. The intensity is linked to the probability or the likelihood that the value to be displayed contains signal or noise-only. That is, based on the Rayleigh model, the larger the value to be displayed, the more probable that the data value contains information, and the higher the intensity used to display the value.

Figure 6:
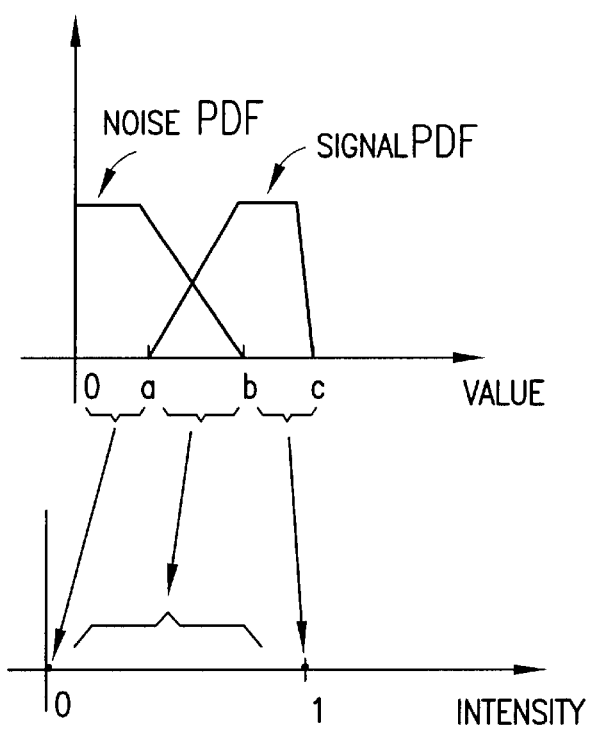
FIG. 6 is a compression or mapping of values to video intensity on the basis of probability density functions.

A metric of the likelihood of a value being attributed to signal or noise can be arrived at from the probability density functions assumed for the noise and signal values. Consider the following example. The signal probability density function (pdf) is denoted $p_s(v)$ and the noise pdf by $p_n(v)$. If $p_n(v) < p_s(v)$, it is more likely that the value, denoted here as v is a signal sample than a noise sample. The degree of likelihood is proportional to the ratio of pdf's, $p_s(v)/p_n(v)$, assuming equi-probable occurrence of signal and noise. This condition is depicted in the somewhat hypothetical example shown in FIG. 6. The values ranging from 0 to a are considered noise values with probability 1 and are mapped to a video intensity of zero. The values ranging from b to c are strong signal values with unity probability and mapped to the highest video intensity of one. For this example, the values ranging from b to c are mapped to the open interval ranging from 0+ to 1−. This mapping can be linear or non-linear depending upon the signal to noise contrast desired. The overall mapping is non-linear in that the region of values from 0 to a is mapped to a single point in the display dynamic range as is the range of values b to c.

Next consider a somewhat more general case. When the scalar value, denoted v, contains signal information, the pdf is denoted $p_S(v)$; when noise-only, $p_N(v)$. In practice, there can be many more occurrences of noise-only values than values containing signal. The probability of a signal value occurring is denoted $p_S$ and the probability of noise-only occurring, $p_N$. One measure of the likelihood of a value being attributed to signal is the ratio of overall signal probability to noise probability, $L_S(v)$, i.e., $$L_S(v) = \frac{p_S(v)p_S}{p_N(v)p_N}$$

$L_S(v)$ is a probability-based metric that lends itself to differentiating between signal and noise. If this ratio is much less than unity, the value of v is assumed to be noise and is mapped to the small region of video allocated to noise. If the value is much greater than unity, the value of v is assumed to be strong signal and is mapped to a somewhat small region of video allocated to strong signals. The remaining dynamic range of the video display is allocated to values of v in a non-linear manner that enhances the display of weak signals, i.e., values of v such that $L_S(v)$ is slightly greater than unity.

Once the signal and noise parameters have been estimated, a gray-scale can be generated automatically. There are a number of ways in which this can be accomplished. The technique described here is based on the likelihood that the value to be displayed contains signal or noise-only based on the estimated parameters and the Rayleigh model for signal and noise.

Figure 7:
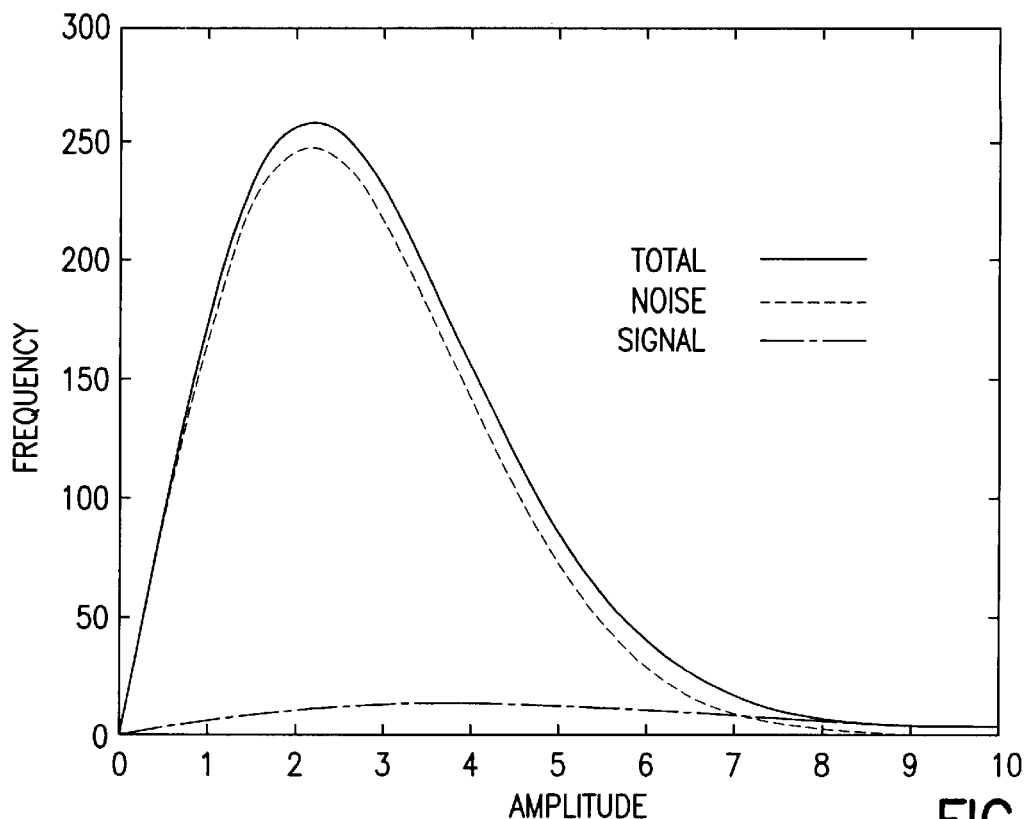
FIG. 7 is a plot of frequency of occurrence of Rayleigh pdf's for adaptive control and signal enhancement.

To demonstrate the auto-generation of the gray-scale, consider the case where the estimate of the signal mean is 7.75, the estimate of the noise mean is 4.5, and the estimate is that 10% of the samples to be displayed contain signal. The frequency of occurrence of signal and noise corresponding to these signal and noise parameters is shown in FIG. 7.

The objective is to map the noise values to the low end of the dynamic range of the display and the signal values to the mid and high range. That is, based on probabilities, if the relative probability is small that the value contains signal, i.e., $N_S p_R(r;u_S) << N_N p_R(r;u_N)$, where $P_R(\ )$ denotes the Rayleigh pdf, it should be mapped to the low end of the display dynamic range. For "reasonable" values of relative probability that the values contain signal, e.g. $N_S p_R(r;u_S) = N_N p_R(r;u_N)$, the values should be mapped to the mid-region of the display dynamic range. For strong signals, $N_S p_R(r;u_S) >> N_N p_R(r;u_N)$ i.e., the value should be mapped to the high end of the dynamic range.

One such function that accomplishes this mapping or compression is the ratio of the signal probability of the value to the sum of the signal probability plus noise probability of this value, i.e., $$G(r) = \frac{N_S p_R(r; \mu_S)}{N_S p_R(r; \mu_S) + N_N p_R(r; \mu_N)}$$

where G(r) denotes the display intensity for a data value r. Note that when $N_S p_R(r;u_S) << N_N p_R(r;u_N)$, the ratio is close to zero and when $N_S p_R(r;u_S) >> N_N p_R(r;u_N)$, the ratio is close to unity. Here zero implies the low end of the dynamic range and unity implies the high end.

Figure 8:
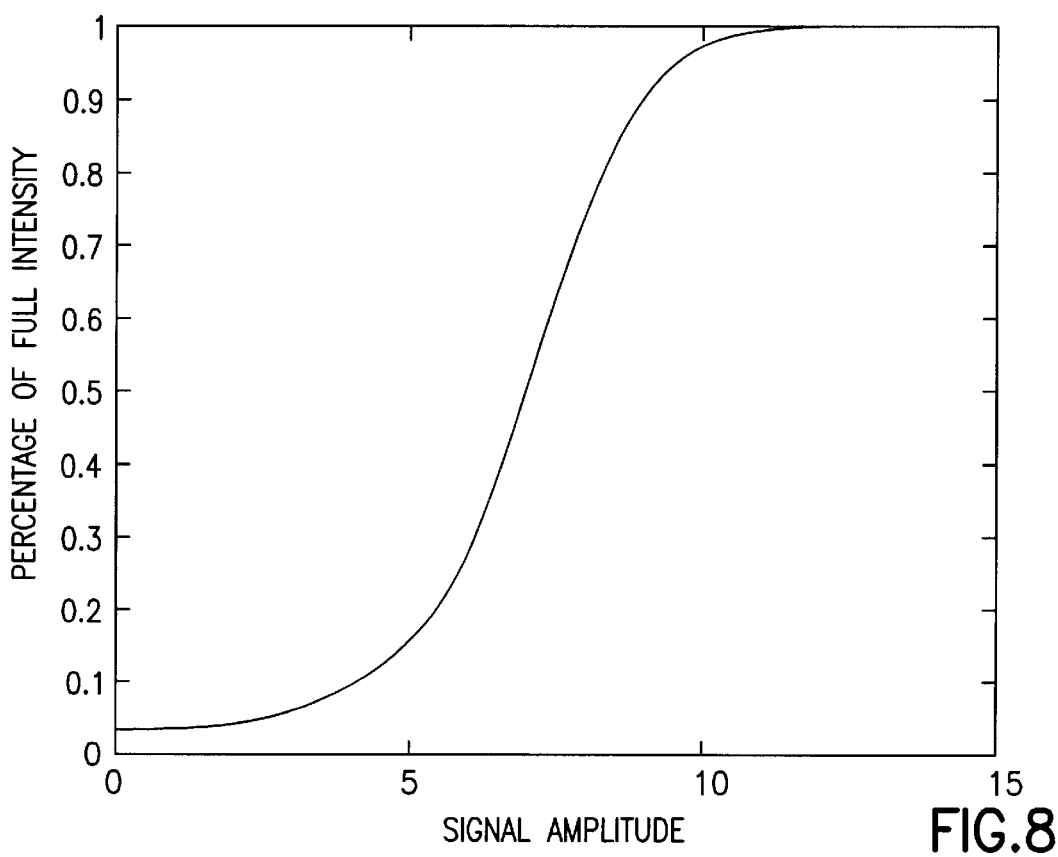
FIG. 8 is a compression curve derived from a ratio of signal probability function to signal plus noise probability function.

A plot of this gray-scale function is shown in FIG. 8 for the signal and noise parameters assumed for this example. This function can serve directly as the map for compressing the data. That is, the input values below seven are considered primarily due to noise and mapped to a low intensity. The values above nine are considered signal and are mapped to the brightest intensity. The values in between are mapped to intensity in a "nearly-linear" manner.

Parameter Estimation

The estimation of the parameters required for auto-generation of the gray-scale is straight forward once the data samples have been classified as signal or noise. The basic premise is that there are $N_T$ samples of a random procedure and that $N_N$ of the samples came from a Rayleigh distribution with mean $u_N$ and that the remaining $N_S$ samples came from a Rayleigh distribution with mean $u_S$. Here, $N_N$ and $U_N$ denote the frequency and mean of the noise-only samples, respectively, and $N_S$ and $u_S$ denote the frequency and mean of the signal samples, respectively; with the assumption that for detectable signals $u_S > U_N$. Since the total number of samples is known, there are three unknown parameters: $u_S$, $u_N$, and $N_N$. $N_S$ is obtained from $N_S = N_T - N_N$.

The procedure for estimation of the required parameters follows. As each data value is classified as signal or as noise, a count is maintained of the number of values classified as signal and the number of values classified as noise. In addition, the average of the values classified as signal and the average of the values classified as noise are calculated and used as estimates of the signal and noise means. In this manner, the variables necessary for auto-generation of the gray-scale function are obtained.

Alternative Auto-Gray-Scale Functions

The ratio described above is only one of many functions that can be used to compress the values to be displayed. However, it does exhibit the desirable characteristics that the region of small values considered noise are mapped to a very limited range of the low end of the display dynamic range as is the region of strong signal values mapped to a limited range at the high end of the display dynamic range. A similar approach allows specification of the curve such that a certain percentage of the noise samples will be displayed in a given region of intensities. For example, it may be desirable to display the lower 75% of the noise range using the bottom 5% of the range of display intensities.

For this auto-gray-scale function, the gray-scale mapping $G(r)$ is given by the equation $$G(r) = \frac{p_R(r; \mu_N)}{p_R(r; \mu_S) + F(p_1, p_2) p_R(r; \mu_N)}$$

where $p_1$ and $p_2$ denote two constraining parameters for control of the shape of the gray-scale function. Note, a function of this form produces a mapping that is approximately zero for small values of r (i.e., for values attributable to noise), and approaches asymptotically unity as r increases to values attributable to signal.

Figure 9:
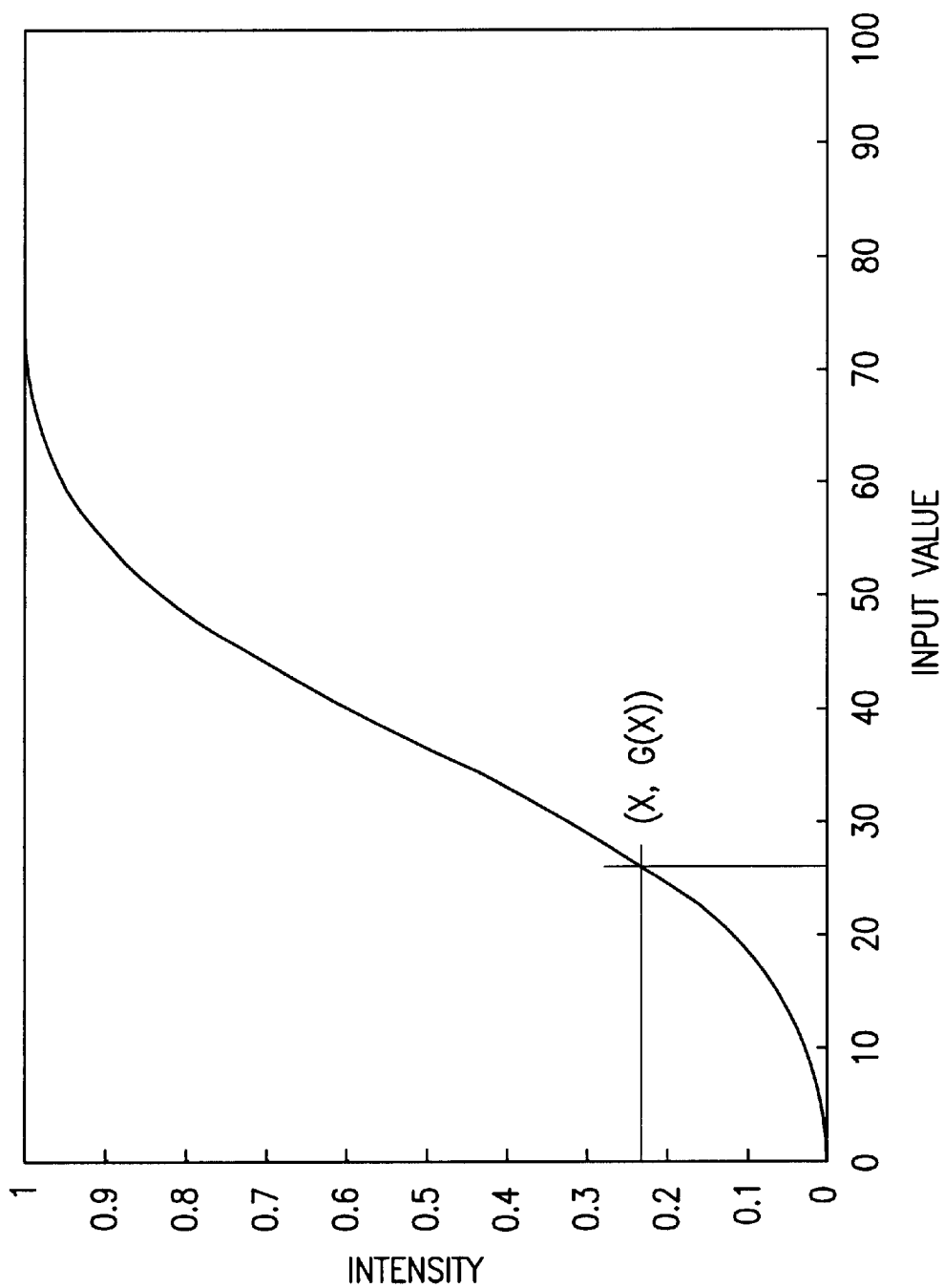
FIG. 9 is a curve depicting gray-scale mapping.

The first step in the derivation is the specification of a point on this curve, denoted $(X, G(X))$, where X denotes the value such that $T_N$ percent of the noise values fall below X. That is, $T_N$ and $G(X)$ are the two constraints for control of the shape of the gray-scale function. This is depicted in FIG. 9. X can be determined from the cumulative distribution function, i.e., $$\int_0^X p_R(\mu_N, x) \, dy = T_N$$

This expression evaluates as follows:

$$\int_0^X \frac{y}{b_N} \exp(-y^2 / 2b_N) \, dy = T_N$$

$$1 - \exp(-X^2 / (2b_N)) = T_N$$

$$-X^2 / (2b_N) = Ln(1 - T_N)$$

$$X = \sqrt{2 b_N Ln(1 - T_N)^{-1}}$$

$$X = 2\mu_N \sqrt{\frac{1}{\pi} Ln(1 - T_N)^{-1}}$$

The next step of this derivation is specification of the gray-scale intensity, $G_X \sim G(X)$ corresponding to an input value of X. That is, $$\frac{p_R(\mu_S, X)}{p_R(\mu_S, X) + F(p_1, p_2) p_R(\mu_N, X)} = G_X$$

$$(1 - G_X) p_R(\mu_S, X) = G_X F(p_1, p_2) p_R(\mu_N, X)$$

$$F(p_1, p_2) = \left( \frac{1 - G_X}{G_X} \right) \frac{p_R(\mu_S, X)}{p_R(\mu_N, X)}$$

Substitution of the Rayleigh for the signal and noise pdf yields:

$$F(p_1, p_2) = \left( \frac{1 - G_X}{G_X} \right) \frac{\frac{X}{b_S} \exp(-X^2 / 2b_S)}{\frac{X}{b_N} \exp(-X^2 / 2b_N)}$$

$$= \left( \frac{1 - G_X}{G_X} \right) \frac{b_N}{b_S} \exp\left( -\frac{X^2}{2} \left( \frac{1}{b_S} - \frac{1}{b_N} \right) \right)$$

$$= \left( \frac{1 - G_X}{G_X} \right) \left( \frac{\mu_N}{\mu_S} \right)^2 \exp\left( -\frac{\pi X^2}{4} \left( \frac{1}{\mu_S^2} - \frac{1}{\mu_N^2} \right) \right)$$

where $$b_S = \frac{2}{\pi} \mu_S^2$$

and similarly for the noise.

In conclusion, various formulations for auto-generation of the gray-scale function are available which rely upon estimates of the signal and noise statistics. The auto-generation can occur with or without operator intervention, that is, the gray-scale function can be produced with a constraint imposed by the operator.

Multiple Signal Condition

The above assumes the existence of a signal with a Rayleigh distribution in the presence of noise. Often there are multiple signals, each characterized by a Rayleigh distribution and corresponding mean. If two or more signals of differing means are present, the estimate of a single mean may not produce a gray-scale function with the desired compression. However, the multiple signal condition can be accommodated in various ways. For example, if both a strong and weak signal occur, a strong signal threshold can be set for detection of strong signals and the strong signal mean and count can be estimated from those signal values that exceed the strong signal threshold. The strong signal mean can be used as a constraint in the auto-generation of the gray-scale function such that an appropriate portion of the range of display intensities is allocated to strong signals.

The remaining values classified as signal can be used to estimate the signal mean and signal count to be used in conjunction with the noise statistics for auto-generation of the gray-scale.

It should be understood that the foregoing description is only illustrative of the invention. Various alternatives and modifications can be devised by those skilled in the art without departing from the invention. For example, the software which controls the operation of the invention has been assumed to have already been loaded into the memory of the system. Those skilled in the art will understand that the controlling code may be stored on a memory media (e.g. see magnetic diskette 29 in FIG. 1) for loading into a controlling CPU, on an as-needed basis. Accordingly, the present invention is intended to embrace all such alternatives, modifications and variances which fall within the scope of the appended claims.

What is claimed is:

1. A method for adaptively altering pixel display values in an ultrasound system in accord with variations in signal to noise, comprising the steps of:
   a) deriving a first regional value for each subject pixel of an image, by taking into account values of a neighborhood of pixels including each said subject pixel;
   b) comparing said first regional value derived for each said subject pixel to a first threshold value related to noise and assigning each said subject pixel a classification as a tentative signal pixel if said first regional value equals or exceeds said first threshold value, any pixel value not so classified considered a tentative noise pixel;
   c) for each subject pixel of said image, assessing a relationship within a second region about said each subject pixel, of tentatively classified signal pixels and noise pixels so as to achieve an improved classification of said each subject pixel;
   d) altering values of at least some of said subject pixels assigned a classification in step c) to improve a display of an image derived from said pixels.

2. The method as recited in claim 1, comprising the added step of:
   e) altering said first threshold value in accordance with values of pixels classified in step d) as noise pixels.

3. The method as recited in claim 2, including the further step of:
   f) adjusting, in said ultrasound system, at least one of transmit power, receive gain and pulse repetition frequency to maintain a desired signal power level to noise power level, based on said threshold noise value and second regional pixel values classified as signal pixels.

4. The method as recited in claim 2, comprising the added step of:
   f) assigning color values to pixels classified as signal pixels, said assigning based upon altered second regional values which result from step e).

5. The method as recited in claim 1, wherein step c) calculates a percentage of tentatively classified signal pixels in said second region and compares said percentage to a second threshold value, which if exceeded by said percentage causes said subject pixel to be classified as a signal pixel.

6. The method as recited in claim 1, wherein step a) derives said first regional value for a pixel by calculating an average value of pixel values in an n×m matrix of pixels, including said subject pixel, where n and m are integers and may or may not be equal in value.

7. The method as recited in claim 1, wherein step d) alters values of pixels classified as signal pixels by increasing their respective values in relation to said noise threshold value.

8. The method as recited in claim 1, wherein step d) alters values of pixels classified as noise pixels by decreasing their respective values in relation to said noise threshold value.

9. The method as recited in claim 1, wherein data resulting from step d) is further employed to enable an audio presentation in conjunction with said display of said image.

10. A memory media for controlling a processor in an ultrasound system to adaptively alter pixel display values in accord with variations in signal to noise, comprising:
    a) code means for controlling said processor to derive a first regional value for each subject pixel of an image, by taking into account values of a neighborhood of pixels including each said subject pixel;
    b) code means for controlling said processor to compare said first regional value derived for each said subject pixel to a threshold value related to noise and to assign each said subject pixel a classification as a tentative signal pixel if said first regional value equals or exceeds said threshold noise, any pixel value not so classified considered a tentative noise pixel;
    c) code means for controlling said processor, for each subject pixel of said image, to assess a relationship within a second region about said each subject pixel, of tentatively classified signal pixels and noise pixels so as to achieve an improved classification of said each subject pixel;
    d) code means for controlling said processor to alter values of at least some of said subject pixels assigned a classification by code means d) to improve a display of an image comprised of said pixels.

11. The memory media as recited in claim 10, further comprising:
    e) code means for controlling said processor to alter said first threshold value in accordance with pixel values classified by code means d) as noise pixels.

12. The memory media as recited in claim 11, further comprising:
    f) code means for controlling said processor to adjust at least one of transmit power, receive gain and pulse repetition frequency in said ultrasound system to maintain a desired signal power level to noise power level, based on said threshold noise value and second regional pixel values classified as signal pixels.

13. The memory media as recited in claim 11, further comprising:
    f) code means for controlling said processor to assign color values to pixels classified as signal pixels, based upon altered second regional values which result from code means e).

14. The memory media as recited in claim 10, wherein code means a) controls said processor to derive said first regional value for a pixel by calculating an average value of pixel values in an n×m matrix of pixels, including said subject pixel, where n and m are integers and may or may not be equal in value.

15. The memory media as recited in claim 14, wherein code means c) controls said processor to step c) to calculate a percentage of tentatively classified signal pixels in said second region and to compare said percentage to a second threshold value, which if exceeded by said percentage causes said subject pixel to be classified as a signal pixel.

16. The memory media as recited in claim 10, wherein code means e) controls said processor to alter values of pixels classified as signal pixels by increasing their respective values in relation to said noise threshold value.

17. The memory media as recited in claim 10, wherein code means e) controls said processor to alter values of pixels classified as noise pixels by decreasing their respective values in relation to said noise threshold value.